United States Patent
Roppel et al.

[11] Patent Number: 6,025,654
[45] Date of Patent: Feb. 15, 2000

[54] METHOD FOR CONTROLLING THE TRANSMISSION OF DATA BETWEEN COMPONENTS AND COMPONENT FOR IMPLEMENTING THE METHOD

[75] Inventors: Rüdiger Roppel, Hildesheim; Detlef Rode, Hemmingen, both of Germany

[73] Assignee: Robert Bosch GmbH, Stuttgart, Germany

[21] Appl. No.: 08/852,232

[22] Filed: May 6, 1997

[30] Foreign Application Priority Data

Jun. 24, 1996 [DE] Germany ............................ 196 25 103

[51] Int. Cl.[7] ........................................................ B60L 1/00
[52] U.S. Cl. ............................. 307/10.1; 340/825; 701/1
[58] Field of Search .................................... 307/9.1–10.8; 701/1, 29, 32–36, 45, 49; 359/123, 142, 146, 173; 340/825, 825.02, 825.03, 825.06, 438

[56] References Cited

U.S. PATENT DOCUMENTS 5,848,367  12/1998  Lotocky et al. ........................... 701/36

*Primary Examiner*—Richard T. Elms
*Attorney, Agent, or Firm*—Fulbright & Jaworski, LLP

[57] ABSTRACT

A method for controlling the transmission of information between components, preferably in a motor vehicle, these components being either data sources or data sinks, wherein a double cascade separates the data transmission of the service components and from that of the music components. The data of the two data cascades can be mixed by means provided in the audio/video sink.

15 Claims, 4 Drawing Sheets

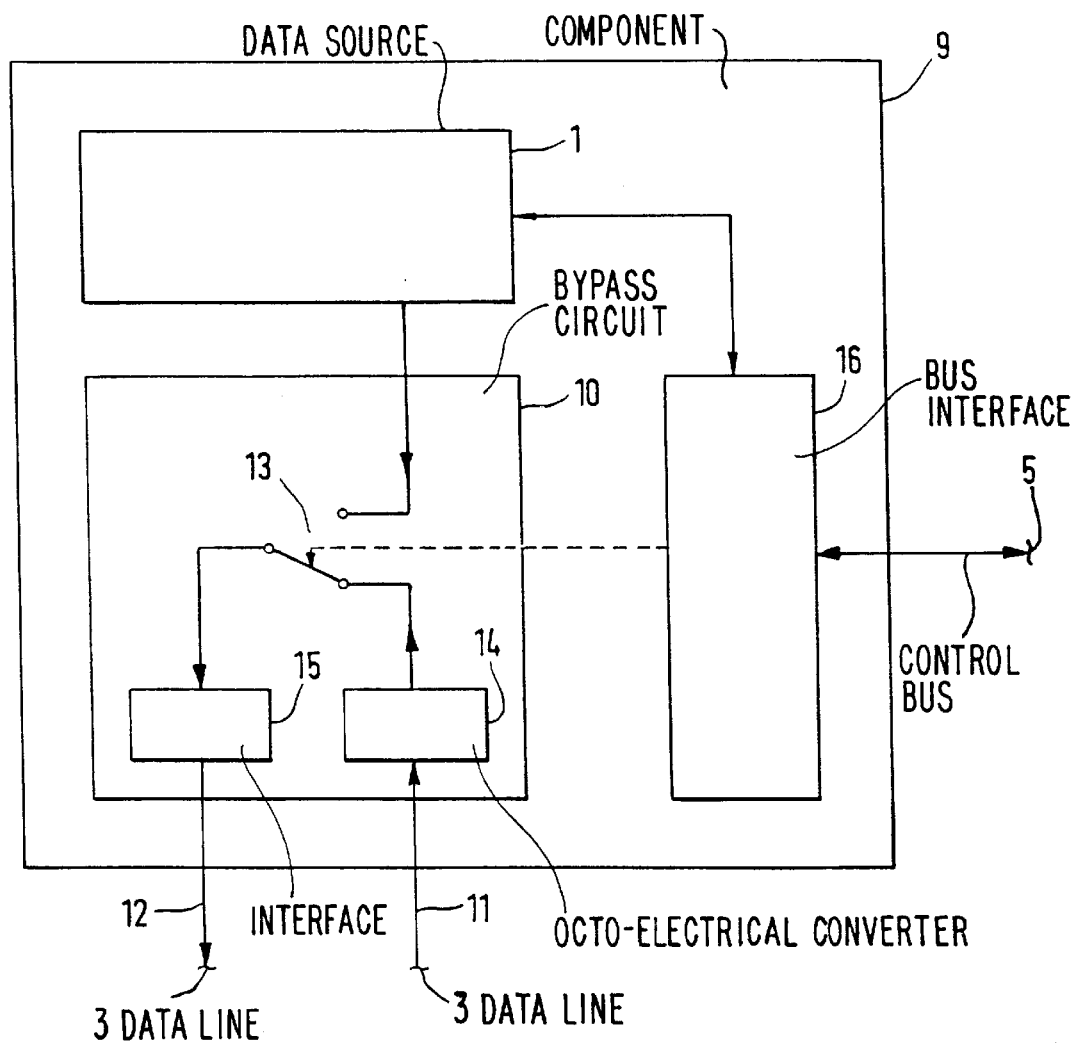

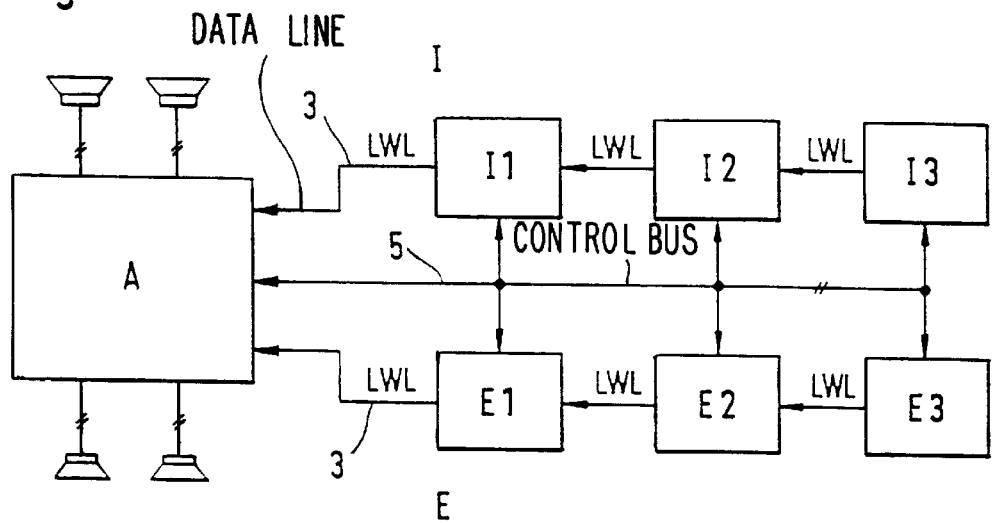
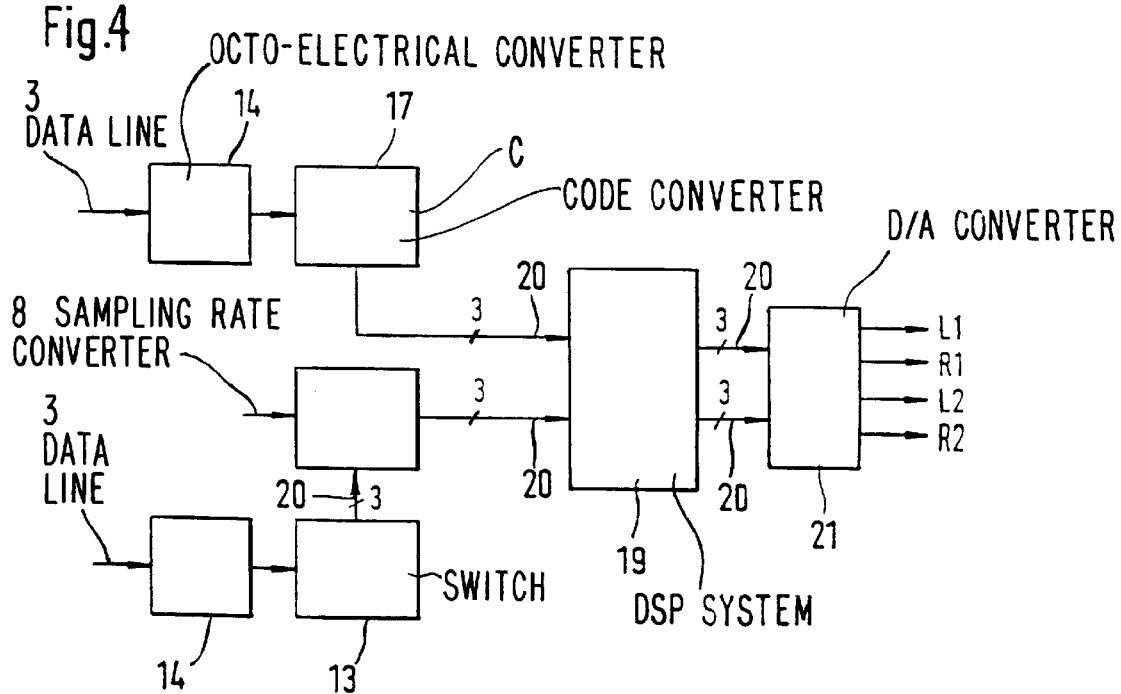

METHOD FOR CONTROLLING THE TRANSMISSION OF DATA BETWEEN COMPONENTS AND COMPONENT FOR IMPLEMENTING THE METHOD

BACKGROUND OF THE INVENTION

The invention proceeds from a method for controlling the transmission of data between electronic components, preferably in a motor vehicle, which either supply information or process it and which are connected to each other and to a controlling component by a control bus.

Methods for controlling the transmission of data between electronic components in a motor vehicle are already known. In spite of a high level of integration, the space required for motor vehicle components in the area of information and entertainment is increasing as a result of increased functionality and complexity. This leads to networked systems and decentralized components. It is necessary to transmit not only control and monitoring information but also audio and video data as well as data such as those stored on CD-ROM's. A modular concept, which allows the data to be transmitted over coaxial cables or fiber-optic waveguides, usually made of plastic, is required for the transmission of these data. For cost reasons, standard communications protocols are used for these transmissions.

A networking of components in motor vehicles in the form of a star topology is known. In this design, several data sources are connected to a data sink. The number of these sources cannot be exceeded by the limited number of free inputs. In addition, a large amount of space is required, and the large number of plug contacts which the data sink must have is also disadvantageous.

Optical ring structures are also known in which both data and control/monitoring information are transmitted over the transmission medium. Each component, whether data source or data sink, has an optoelectronic converter at its input and an electro-optic converter at its output. A protocol processor makes it possible for the data to be read in and out. In a ring structure, the data stream must be timed. The disadvantage of a ring topology and of the transmission of all the data over the same medium is the fact that a break at any point puts the entire network out of service. Components in a ring structure which have no data burden of their own beyond information for control and monitoring, e.g., remote controls, have an over-sized interface.

SUMMARY OF THE INVENTION

According to the invention, two components for transmitting information and at least one component for processing the information are actively connected by means of the controlling component. Independently operating first and second data lines are provided. The information of the first actively connected transmitting component is fed into the first data line, and the information of the second actively connected transmitting component is fed into the second data line.

This method offers the advantage that pure data transmission is disconnected from the control and monitoring function, and that a common control line connects two components or groups of components, which are connected separately to a first and a second data line. Because of the doubled data lines, the number of transmittable channels is increased, so that at least two sources can send data to the processing component, e.g., the audio sink, simultaneously. As long as no restrictions are imposed by the protocol used, it is also possible, in the case of audio data, for example, to transmit 4 mono signals and thus four different source signals simultaneously. A break in one of the data lines leads to the loss of the data of the components on the data line in question which are on the other side of the break with respect to the data source, but the rest of the components can continue to operate normally.

By providing a two-fold cascade structure, in which the sequences of the components are arbitrary and in which the number of components is not limited by the number of plug-in sites, advantages are achieved with respect to data transmission. The term "cascade" refers here to the idea of coupling components which have a common data and control line to each other in a point-to-point manner. It is also advantageous that the data streams are conducted via bypass circuits through the individual electronic components which are not actively connected to the circuit. This has the advantage that a simple circuit is able to transmit the data between the components, and no active timing regeneration with a phase-locked loop is required. Thus the electronic complexity for a component of the data network is reduced.

Because of the possibility of using the cascade both for analog and for digital data transmission, the method is flexible in its application and can be quickly upgraded from the current state of the art to meet future, higher requirements.

The method is suitable for the transmission of data by means of standard communications protocols. It is advantageous for the data to be transmitted with self-timed encoding.

When standard protocols are used, it is possible if desired for data from the two separate data lines or from two separate channels to be processed.

The best way to realize the method is with fiber-optic waveguide data lines, where the bypass switch is actuated electrically, after the light has been converted. This is a low-cost solution, although the use of an optical switch would certainly have to be evaluated in the future.

The components for implementing the method advantageously have a connection to the control bus and also a connection to the data line in question, the connection to the data line being actively established by the control bus.

It is an advantage of the double cascade, that, in the case of audio transmission, for example, the data lines can terminate in a mixer in the audio sink. The mixer then makes it possible to superimpose a signal from one source on the signal from another.

It is also advantageous to design the components in such a way that one switch can be used to access several data lines.

BRIEF DESCRIPTION OF THE DRAWING

FIG. 2 shows the design of a source component in the data cascade.

FIG. 3 shows an exemplary embodiment of the cascading system.

FIG. 4 shows a circuit for an audio sink in the double cascade; and

DESCRIPTION OF THE EXEMPLARY EMBODIMENT

Figure 1:
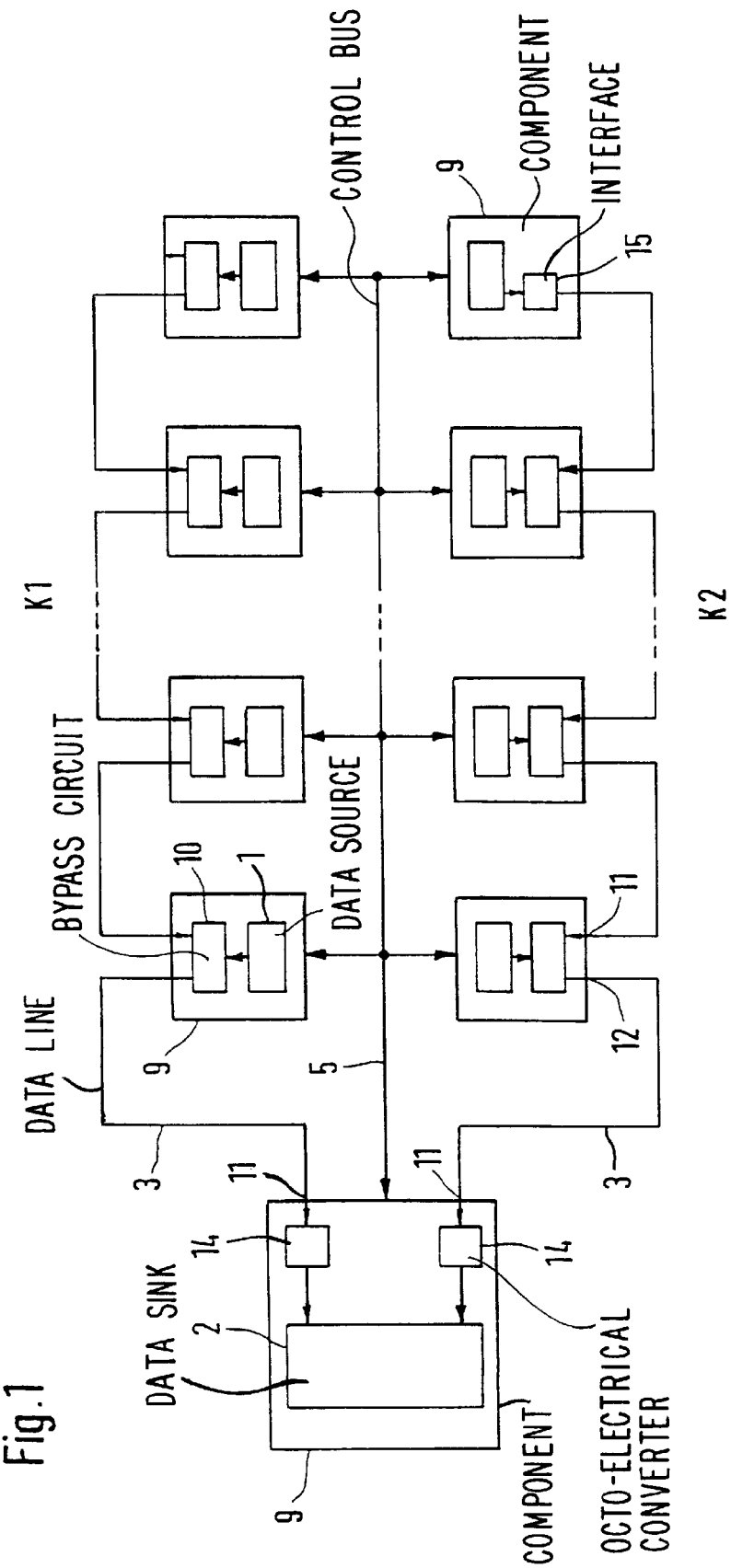
FIG. 1 shows a networked system according to the invention.

FIG. 1 shows a network with a double cascade system consisting of cascades K1 and K2. The networked system according to the invention assumes that the control/ monitoring data are separated in the communications sense from the useful data. The data are transmitted over data lines 3. The transmission itself advantageously uses a digital communications protocol, which uses self- timed encoding. An encoding scheme of this type is, for example, biphase mark encoding, which makes it possible for data to be transmitted synchronously over data line 3. Control is imposed via the MMI (Man-Machine Interface) master, which can also be integrated into a component. The master represents the interface with the user. An MMI master is characterized in that it monitors and possibly stores in nonvolatile memory all of the conditions which are relevant to the networking of the data. Components 9 are either data sources 1 or data sinks 2. Within a cascade, each component 9 has a data output 12 and a data input 11. Both input and output are connected to source 1 by a bypass 10. The end components can be data sources, which then have only a data output 12. Components 9 which are not data sources or data sinks but which merely require control information or merely make such control information available are connected to control bus 5. In general, a data sink is located at the end of a cascade. Data sources and data sinks contain all the necessary sending and receiving interfaces. The sequence in the data cascade is arbitrary if there is only one data sink.

FIG. 2 shows the design of an arbitrary component 9. In the component, control/monitoring bus 5 is connected to a bus interface 16, which is controlled by a microprocessor. Data source 1 with its encoding circuit communicates with the control unit via the microprocessor system. Component 9 has a bypass circuit 10. Input 11, which in this case is connected to a fiber-optic waveguide, must be provided with an opto-electronic converter 14. Switch 13 can connect input 11 to output 12. In general, the MMI master activates the source, such as a CD changer, by sending a command over the control bus. In the case of a navigation device, data source 1 informs the master of the data cascade that driving instructions are available by sending the master a message via the control/monitoring bus that data are standing by for transmission to the data sink. The instruction actively to connect this data source arrives via the control/monitoring bus. Then switch 13 to the data source is flipped, and the signals of the data source pass via electro-optic converter 15 to output 12 and data line 3. There is always one data source active in the cascade; all the other components pass the data stream through their bypass circuits 10. An essential feature of the bypass circuit is its design as a simple circuit component, which allows the data stream to pass through without timing regeneration. The switch itself can be a CMOS switch, but it is also conceivable as an alternative that optical bypass switches could be used. The maximum number of components allowed in a data cascade is determined by the quality of transmission lines 3 and of interface circuits 14, 15. When suitable interface circuits and fiber- optic waveguide systems, e.g., plastic fiber-optic waveguides, are used, it is possible for up to 10 components to be hooked up to the cascade. Relative to the cascade, it is possible to distinguish between four different types of components 9:

(a) Data sinks (end components): The data sink has only an input 11.

(b) Cascadable data sources: Each component has a data input 11 and a data output 12. In addition, a bypass circuit 10 is integrated into the component; this circuit consists essentially of a two-way switch, made according to CMOS technology, for example, with two positions: internal source active//arbitrary external source active. The position of the switch is monitored by the microprocessor system with its bus interface and controlled by MMI master 8 over control/monitoring bus 5. If there is a problem with the bus interface, the switch is automatically shifted back to the default setting, namely, pass-through.

(c) Noncascadable data source (end component) An end component has only a data output 12. Precisely one end component can be present in each system. Whether a component is designed as an end component or not depends in general on the configuration probability and on the probable installation site.

(d) Components which do not process data within the cascade: Components which have no connection for a data cascade can still be operated in the network by way of control and monitoring bus 5.

In principle, the cascade is suitable for both coaxial cables and fiber-optic waveguides. In both cases, an interface circuit (e.g., potential separation, signal conversion from optical to electrical, etc.) is required. In the cascade, the same communications protocol should be used for all of the components, but in the case of audio transmission, different sampling rates can be present in the components. The allowable sampling rates depend only on the communications protocol used and on the PLL range of the data sink. It may well be advisable to use different communications protocols or transmission media for the two cascades. For example, in the case of a service cascade, transmission can occur over coaxial cables, whereas in a music cascade, fiber-optic waveguides would carry the transmissions.

FIG. 3 shows a concrete embodiment of a network in an automobile. On dashboard A of the motor vehicle there is a car radio with integrated control function. This audio sink is connected by way of a CAN bus 5 to the components, some of which are installed in the trunk. The upper data cascade is a service and information cascade I for the data components which need to transmit data only for certain periods of time to the audio sink; such components could include, for example, a telephone I1, a traffic message channel I2 for digital radio messages, or a navigation device I3. The music components are on side E; these include data sources such as a radio receiver E1, a CD player with changer E2, etc. The data of these components are sent through fiber- optic waveguides 3 to the data sink, in this case the radio. In a double cascade, the audio sink must contain a processing unit to process the data from the two cascade branches. The Controller Area Network [CAN] is used as basis for the control/monitoring bus. The communications protocol for the audio data of the two cascades can be, for example, an S/P-DIF protocol, which means that a stereo channel is available for each one.

With this arrangement, it is possible to superimpose a news report from the service cascade onto an audio playback.

FIG. 4 shows the details of the audio and data sink. The data streams of data lines 3 are converted optoelectronically 14 and sent on to code converter 17. The code converter converts the S/P-DIF protocol to the internally used three- wire bus I$^2$S. To match the sampling rate or sampling frequency and to synchronize the signals, a sampling rate converter 18 must be installed in one of the two cascades directly in front of the sink. The timing for this unit is specified either by the signal of the other cascade, that is, by an internal or external data source of the other group, or by internal processor timing. DSP system 19 can then mix or process the digital data streams in any desired way. Internal data sources such as those which normally occur in a car radio are not shown in FIG. 4. As a result of the double cascade, it is possible for a service message to be mixed with the current music source. After digital/analog conversion 21, the signal is ready for output. The voice output can occur as desired on any channel (left or right channel; 1 or 2). Separate tone adjustments for each source are very easy to realize by the central data processing function in the audio sink. Because the actual data processing takes place exclusively in the audio sink, expensive signal processors are needed in only one place. In addition, the double cascade is compatible with any single cascade. When a mixing of two service sources is required in addition to the mixing of service and music components, there exists the possibility, in the case of service sources which require only one mono channel, of transmitting both data streams synchronously by means of a standard communications protocol such as S/P-DIF. In this case, however, the complexity of the service components increases, because the two sources must be synchronized for the data transmission. For this purpose, a sampling rate converter is required, as well as a unit which makes it possible to select the channel by way of the control bus.

Figure 5:
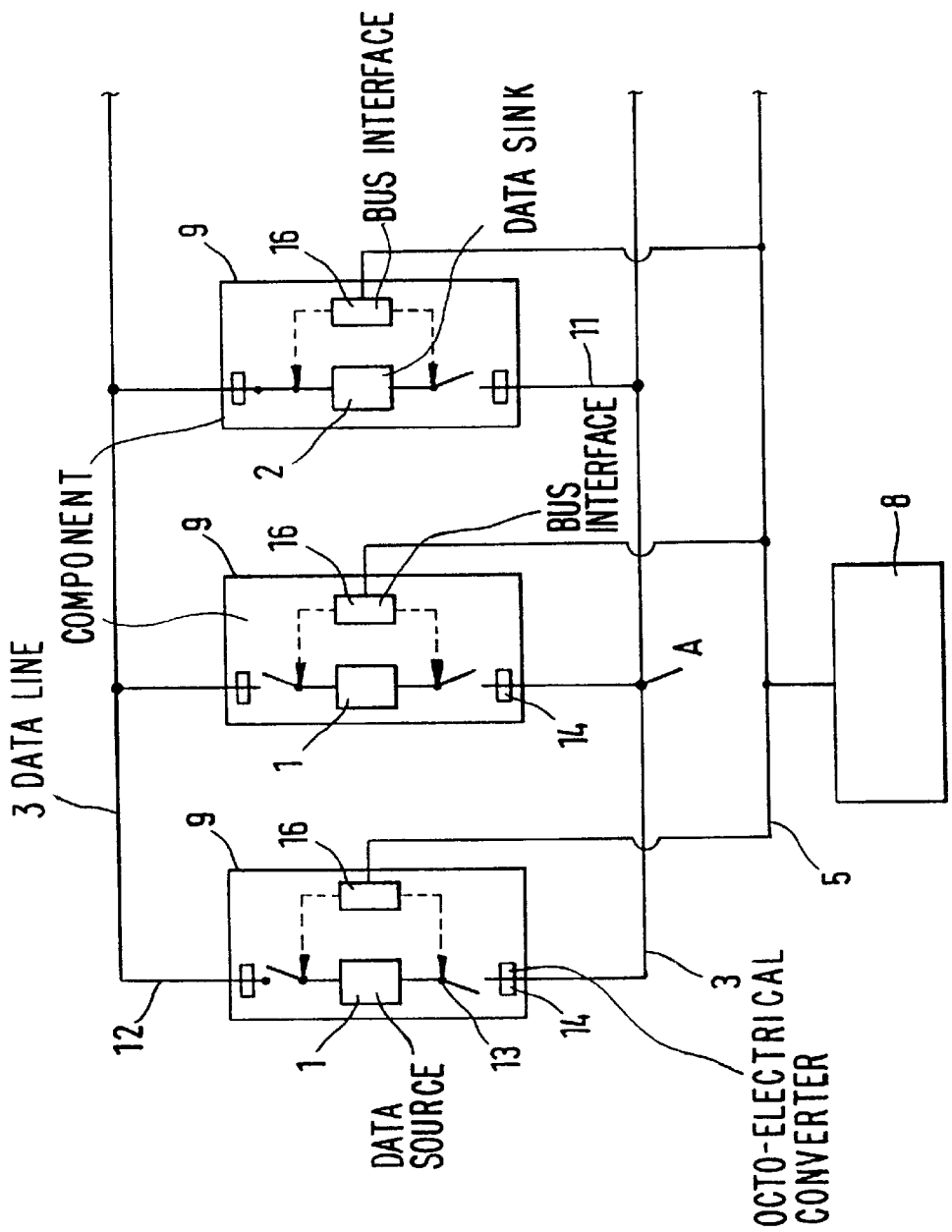
FIG. 5 shows a design without a bypass circuit.

FIG. 5 shows an embodiment which omits the bypass circuit in components 9. Data sources 1 can be connected by way of switches 13 to data lines 3. In between, an optoelectric or electro-optic converter 14 must be inserted for optical transmission. Switch 13 is actuated via a control unit 16 by control bus 5. The switches can connect data sources 1 and/or data sinks 2 either to the upper or to the lower data line, so that two different transmitters 1 can send their information to two different data lines 3. A circuit connection of this type, however, can be used to only a limited extent for optical transmission, because connection points A entail a certain cost. A circuit of this type will be therefore be used for electrical transmissions without converter elements 14.

We claim:

1. Method for controlling the transmission of information between electronic components, which either supply information or process it and which are connected to each other and to a controlling component by a control bus, wherein a first component for transmitting or receiving information, a second component for transmitting or receiving information and at least one component for processing information have an input for the control bus, and signals which actuate a switching device, which, when actuated, switches at least one of the above components into a transmitting or a receiving state, said method comprising:

actively connecting said first and second components and said at least one component for processing information by means of the controlling component;

providing a first data line and a second data line operating independently of each other;

feeding the information of the first actively connected, transmitting component into the first data line; and feeding the information of the second actively connected transmitting component into the second data line.

2. Method for controlling the transmission of information according to claim 1 wherein the data lines connect the electronic components in the form of a cascade, and wherein data are sent through via a bypass circuit inside the nonactive components of the cascade.

3. Method for controlling the transmission of information according to claim 1 wherein the data lines transmit information which is in in at least one form from the group consisting of analog or digital.

4. Method for controlling the transmission of information according to claim 1 wherein standard transmission protocols are used for the transmission of the data between two components over the data lines.

5. Method for controlling the transmission of information according to claim 1 wherein data transmissions in the two data lines proceed serially from point to point with self-timed encoding.

6. Method for controlling the transmission of information according to claim 1 wherein signals entering the processing component originate from separate data lines.

7. Method for controlling the transmission of information according to claim 1 wherein signals entering the processing component originate from a data line with several communications channels.

8. Method for controlling the transmission of information according to claim 1 wherein the data line is a plastic fiber-optic waveguide and in that the data input and output are connected via optocouplers to an electrical switch.

9. Method for controlling the transmission of information according to claim 1 wherein the components are controlled by a separate control component.

10. Method according to claim 1, wherein components which are not end components have a bypass circuit and an input for the control bus, signals of which actuate a switching device, which, when actuated, switches the components into a sending or receiving state.

11. Method according to claim 1, wherein digital information is sent through the bypass circuit without timing regeneration, the switching being carried out electrically or optically.

12. Method according to claim 1, wherein a control function for the control contains bus is integrated into a component.

13. Method according to claim 1, wherein the processing component contains means for mixing and outputting the incoming signals.

14. Method according to claim 1, wherein the components have a circuit which is controlled by signals from the control bus and which connects the inputs and outputs for the data to be sent or received to different data lines.

15. Apparatus for controlling the transmission of information between electronic components, said apparatus comprising:

first and second components for transmitting or receiving information;

at least one processing component for processing information;

a controlling component;

a control bus actively connecting said first and second components, said processing component, and said controlling component, wherein the first and second components and the at least one processing component for processing information have an input for the control bus, and signals which actuate a switching device, which, when actuated, switches at least one of the above components into a transmitting or a receiving state; and first and second data lines independently receiving information from respective transmitting components and connecting the respective transmitting component, said controlling component, or said processing component.

* * * * *

UNITED STATES PATENT AND TRADEMARK OFFICE
CERTIFICATE OF CORRECTION

PATENT NO. : 6,025,654
DATED : Feb. 15, 2000
INVENTOR(S) : Roppel et al.

It is certified that error appears in the above-identified patent and that said Letters Patent is hereby corrected as shown below:

In column 4, line 8, after "component)" insert - - : - -.

In column 5, line 66, change "in in" to - - in - -.

On the cover page, in the section entitled Foreign Application Priority Data, change "196 25 103" to - - 196 25 103.6 - -.

Signed and Sealed this

Eighth Day of May, 2001

Attest:

NICHOLAS P. GODICI

Attesting Officer     Acting Director of the United States Patent and Trademark Office